Patented Sept. 1, 1953

2,650,892

UNITED STATES PATENT OFFICE 2,650,892

ALKYL MONOAMINE SALTS OF PENTA-CHLORPHENOL USEFUL FOR CONTROLLING MITES

Gene M. Le Fave, New Augusta, Ind., assignor to J. I. Holcomb Manufacturing Company, Indianapolis, Ind., a corporation of Indiana No Drawing. Application December 7, 1951, Serial No. 260,559

16 Claims. (Cl. 167—31)

1

This invention relates to new and useful chemical compositions and especially to compositions which are effective as arachnicides, being excellent exterminators of red spider, or red mite.

As is well known, there are several excellent pest control materials available, including, for example, the material commonly referred to as DDT and which contains as the essential ingredient 1,1-bis(p-chlorophenyl)2,2,2 trichloroethane. This material is very powerful but it is by no means perfect. Its action is specific. That is to say, it is extremely effective against some pests and has no effect whatsoever on others. Additionally, it kills many beneficial insects such as honey bees and insects that are predators against other harmful species. It is obvious, therefore, that the use of DDT under certain circumstances may be of little or no value.

A plant may be infested by two harmful insects, one of which is kept under control by a third predatory insect. Upon applying DDT in such cases one of the harmful insects and the predatory insect against the other harmful insect may be killed. Thus, the second harmful insect which was previously kept in check by its natural enemy then becomes a serious pest. This may be specifically illustrated in the case of apples. Apple trees are infested by codling moths, aphids and red mites. The last two are more or less controlled by lady bird beetles, other predaceous insects and certain parasitic insects. The DDT destroys the codling moth but at the same time destroys beneficial predators and parasites with the result that the aphids or red mite population may increase to such an extent that these pests will do as much or more harm than was previously done by the codling moth.

It is one of the objects of the present invention to provide a new and improved type of pest control composition which is extremely effective against red mite, also known as red spider.

A further object of the invention is to provide new and useful arachnicidal compositions.

An additional object of the invention is to provide a new method of destroying red mite without injuring the host vegetation.

Another object of the invention is to provide new and useful compounds and compositions of matter which have new and useful properties.

2

Another object of the invention is to provide compounds of the character described which are crystalline solids, appreciably soluble in organic solvents and substantially insoluble in water.

A further object is to provide new and useful compounds which are practically unaffected by carbon dioxide, are stable to light and air, are relatively non-irritant to human skin and substantially non-injurious to plant life. Other objects will appear hereinafter.

These objects are accomplished in accordance with this invention by the preparation of compounds which are alkyl monoamine salts of pentachlorophenol containing not more than five carbon atoms in the alkyl groups.

These compounds have the following chemical structures depending upon whether they are derived from primary, secondary or tertiary alkyl monoamines:

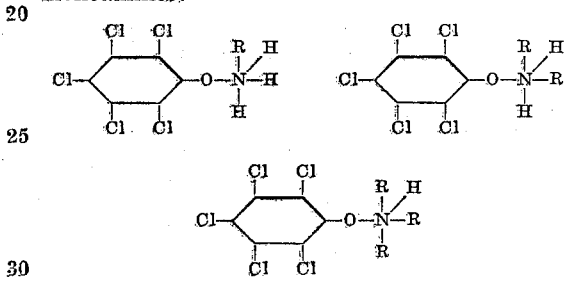

wherein R is an alkyl group containing from 1 to 5 carbon atoms inclusive.

The compounds of the invention are crystalline solids, appreciably soluble in organic solvents and virtually insoluble in water. They are practically unaffected by carbon dioxide, stable to light and air, and relatively non-irritant to human skin.

The new compounds are prepared in excellent yield by reacting alkyl amines with pentachlorophenol in substantially equimolar proportions, although any suitable amount may be employed. Where an excess of one or the other reactant is employed, separation may be readily accomplished by extraction of the crude salt product with alcohol, benzene, or other preferential solvent for the pentachlorophenol and amine, or for the amine salt. The crude reaction product, consisting essentially of the amine salt, is adapted to be used as a miticidal agent without further purification.

A preferred method of operation comprises conducting the reaction in an organic solvent such as alcohol, chlorobenzene or toluene. The operating temperatures are not critical, although a smaller amount of solvent is required when the reaction is carried out at relatively elevated temperatures, e. g., between 40° C. and 120° C., and at the refluxing temperatures of the reaction mixture.

An alternate method consists in carrying out the reaction in water solution. In this modification of the procedure an alkali salt of pentachlorophenol is reacted with the sulfate or other acid salt of the amine. The amine salt end product obtained is sufficiently insoluble in water that there is no problem of separation or isolation.

In order to insure formation of a homogeneous product, the reactants are preferably mixed portionwise with good stirring for a short time. When the reaction is completed, the reaction solvent is driven off by warming and the residue dispersed in a selective solvent to extract out unreacted amine or pentachlorophenol remaining therein.

Alternatively, the reaction mixture may be cooled and the solid filtered or otherwise manipulated to separate out the desired amine salt compound. Where it is desired to impregnate solid carriers with the amine salt, the carrier may be introduced into the reaction mixture and the phenate precipitated directly in and on the carrier surfaces. An alternate procedure consists in first wetting a solid finely divided carrier with one of the toxicants, e. g., the chlorophenol, dissolved in a suitable organic solvent, and thereafter contacting the mixture with a solution of the second reactant, e. g., the amine, to produce the desired compound in situ.

The compounds as set forth above may be used as constituents of either dusting or spraying compositions. Thus, they may be formulated with various finely divided inert diluents such as clays, talc, wood flours, bentonite and the like to form dusts adapted to application to plants or other mite infested objects and surfaces with standard dusting methods. If desired, such dusts may be employed as concentrates and subsequently modified with additional finely divided carrier or suspended in water or other liquid diluent to form sprays. The amine salts may also be incorporated with various wetting, dispersing, and sticking agents, and subsequently diluted to produce spray or dust compositions in which the salt is present in any desired concentration.

In the preparation of concentrates, from about 3 to about 80% of the amine salt is commonly employed. The concentration of the salt in the ultimate spray or dust composition is usually between 0.001% and 0.1% by weight. The type of composition in which the salt is used and the concentration thereof in the final composition are dependent on the particular mite to be controlled and the conditions under which such control is to be accomplished.

In other embodiments of the invention, the amine salts may be employed in combination with oil emulsions. They may also be employed in water suspension with or without an additional emulsifying, wetting or dispersing agent. The salts may be similarly incorporated in other standard type insecticidal and fungicidal compositions either as the sole toxic ingredient of such mixture or in combination with such materials as DDT, sulfur, copper sprays, pyrethrum, nicotine, rotenone, organic thiocyanates, and the like. As previously indicated, with the advent of large scale use of many organic insecticides there has been a great increase in mite infestation due to killing of the natural enemies of the mite resulting in an unbalanced insect population. It is thus desirable to incorporate a highly effective miticide in combination with other insecticides so as to restore this balance.

The several examples following will be illustrative with respect to the particular compounds, composition types, and the concentrations employed but are not to be construed as limiting the invention thereto.

EXAMPLE I

A mixture of 10.1 grams (0.1 mol) of triethylamine, 26.6 grams (0.1 mol) of pentachlorophenol and 25 grams of isopropanol was warmed at 40° C. for a period of an hour after the initial heat of reaction had subsided. After cooling, the white crystalline solid was filtered, washed with cold methanol and dried. The resulting product consisted of 31 grams of the triethylamine salt of pentachlorophenol melting at 134° C. to 135° C. This material was soluble in xylene, carbon tetrachloride and 95% ethanol and negligibly soluble in water.

EXAMPLE II

In a similar manner pentachlorophenol was reacted with relatively short chain amines of the class described to obtain the following compounds:

Isopropylamine salt of pentachlorophenol as a white crystalline solid melting at 158° C. to 159° C.
n-Amylamine salt of pentachlorophenol as a white crystalline solid melting at 125° C. to 126° C.
Ethylamine salt of pentachlorophenol as a white crystalline solid melting at 187° C. to 188° C.
n-Butylamine salt of pentachlorophenol as a white crystalline solid melting at 168° C. to 169° C.

EXAMPLE III

The amine salts of pentachlorophenol were employed for the control of red spider. In these determinations 16.6 parts by weight of the amine salt, 66.7 parts of diatomaceous earth, and 16.6 parts of sodium lauryl sulfate were ground together to produce a miticidal concentrate. Sufficient of this mixture was then dispersed in water to give a concentration of 0.4 pound of the amine salt per 100 gallons of spray mixture. The compositions so obtained were sprayed for 10 seconds on both surfaces of infested lima bean leaves to obtain high kills of this pest without any injury whatever to the host plant.

The following results were obtained with the compounds listed:

Table I

| Compound | Percent Dead Nymphs and Adults After 72 Hours |
|---|---|
| Triethylamine salt of pentachlorophenol | 100 |
| Isopropylamine salt of pentachlorophenol | 90 |
| Ethylamine salt of pentachlorophenol | 75 |

EXAMPLE IV

Miticidal concentrates comprising the amine salts of pentachlorophenol as toxic ingredients are illustrated by the following.

| Compound | Parts by Weight |
| --- | --- |
| Composition A: | |
| Triethylamine salt of pentachlorophenol | 15 |
| Bentonite | 70 |
| Sodium salt of sulfonated butyl naphthalene | 15 |
| Composition B: | |
| Dimethylamine salt of pentachlorophenol | 25 |
| Clay | 60 |
| Sodium lauryl sulfate | 15 |
| Composition C: | |
| Isopropylamine salt of pentachlorophenol | 15 |
| Pine oil | 40 |
| Sodium salt of sulfonated castor oil | 45 |

The foregoing compositions may be diluted with water to obtain spray mixtures adapted to application for orchards, gardens, soil adjacent to growing plants, and the like.

It will be apparent from the foregoing discussion that the compounds falling within the scope of the invention are addition products of any of the following: primary amines, e. g., methyl amine, ethyl amine, propylamine, isopropylamine, butylamine, isobutylamine, isoamylamine and amylamine reacted with pentachlorophenol; secondary amines such as dimethylamine, diethylamine, secondary butylamine, dipropylamine, diisopropylamine, dibutylamine, diisobutylamine, diamylamine and diisoamylamine reacted with pentachlorophenol; and tertiary amines such as trimethylamine, triethylamine, tripropylamine, tributylamine, triisobutylamine, triamylamine and triisoamylamine reacted with pentachlorophenol.

It was noted that the tertiary amine salts of the polychlorophenols of the class described, e. g., the triethylamine salt of pentachlorophenol, were effective not only in killing the nympths and adults of red spider but also successfully destroyed the eggs. The tertiary amine salts of pentachlorophenol, therefore, represent preferred products for the practice of the present invention.

The hydroxy alkyl amine salts of pentachlorophenol, for example, diethanolamine pentachlorophenate, were prepared and found to be less desirable, particularly because of their increased water solubility due to the presence of hydroxy groups.

The amine salts of polychlorophenols containing less than five chlorine atoms where prepared and tested for miticidal activity against red spider mite but were found to be ineffective under test conditions where the pentachlorophenate derivatives, for example, triethylamine pentachlorophenate were 100% effective. In one series of screening tests dimethylamine 2,4,6-trichlorophenate, n - butylamine 2,4,5-trichlorophenate and triethylamine tetrachlorophenate were formulated into emulsions using benzene, Triton X-100 and distilled water (Triton X-100 is an alkylated aryl polyether alcohol used as a wetting and emulsifying agent). At concentrations of 0.05 and 0.1% these compositions when applied to red spider mite showed no kill after 72 hours, and exhibited no ovicidal action.

Hexylamine pentachlorophenate, heptylamine pentachlorophenate, and dihexylamine pentachlorophenate when tested for miticidal action against Tetranychus atlanticus at a concentration of 0.1% killed the red spider mite on lima bean seedlings to the extent of 75%, in the case of the hexylamine pentachlorophenate after 48 hours, and to the extent of 100% in the case of the heptylamine- and dihexylamine pentachlorophenates after 48 hours but were exceedingly phytotoxic even at this relatively low concentration. The leaves were injured within 24 hours and in 48 hours the leaves were dead. On the other hand, in the same series of tests the amylamine pentachlorophenate, although exhibiting approximately the same toxicity as the hexylamine pentachlorophenate was not phytotoxic at a concentration of 0.1%. Thus it appears that there is an enhanced phytotoxic action where the alkyl group of the alkylamine pentachlorophenate contains more than five carbon atoms which precludes the use of such compounds at practical concentrations.

The compounds of the present invention are especially advantageous for use in destroying red mite because of their relatively high water insolubility, light stability and compatibility with other parasiticidal materials. Many phenolic compounds have not been found to be particularly suited in many applications because of their high water solubility, light instability and incompatibility with other parasiticidal materials. Many other compounds, such as dinitro derivatives of phenolic compounds, affect the metabolism of both humans and plants so that their use must be carefully controlled.

The compounds of the present invention are effective at concentrations below 1%, preferably 0.05% to 0.1%, and have been applied to growing foliage with little or no damage to the foliage.

This application is a continuation-in-part of my copending application Serial No. 224,669, filed May 4, 1951, now abandoned.

The invention is hereby claimed as follows:

1. The alkyl monoamine salts of pentachlorophenol containing not more than 5 carbon atoms in each of the alkyl groups.

2. The primary alkyl monoamine salts of pentachlorophenol containing not more than 5 carbon atoms in the alkyl group.

3. The secondary alkyl monoamine salts of pentachlorophenol containing not more than 5 carbon atoms in each of the alkyl groups.

4. The tertiary alkyl monoamine salts of pentachlorophenol containing not more than 5 carbon atoms in each of the alkyl groups.

5. The triethylamine salt of pentachlorophenol.

6. The isopropylamine salt of pentachlorophenol.

7. The n-amylamine salt of pentachlorophenol.

8. The ethylamine salt of pentachlorophenol.

9. The dimethylamine salt of pentachlorophenol.

10. A miticidal composition comprising as an active essential ingredient an alkyl monoamine salt of pentachlorophenol containing not more than 5 carbon atoms in each alkyl group.

11. A miticidal composition comprising as an active essential ingredient a tertiary alkyl monoamine salt of pentachlorophenol in which each of the alkyl groups contains not more than 5 carbon atoms.

12. A miticidal composition comprising as an active essential ingredient the triethylamine salt of pentachlorophenol.

13. A method of destroying red mite which comprises applying thereto a composition containing an alkyl monoamine salt of pentachlorophenol in which the alkyl groups each have no more than 5 carbon atoms.

14. A method of destroying red mite which comprises applying to the foliage of vegetation subject to infestation by red mite an alkyl monoamine salt of pentachlorophenol in which the alkyl groups each contain not more than 5 carbon atoms.

15. A method of destroying red mite which comprises applying thereto a tertiary alkyl monoamine salt of pentachlorophenol in which the alkyl groups each contain not more than 5 carbon atoms.

16. A method of destroying pests including red mite which comprises applying thereto a composition containing the triethylamine salt of pentachlorophenol.

GENE M. LE FAVE.

References Cited in the file of this patent

UNITED STATES PATENTS

| Number | Name | Date |
|---|---|---|
| 1,919,298 | Lehmann | July 25, 1933 |
| 2,235,629 | Clifford | Mar. 18, 1941 |
| 2,382,976 | Coleman | Aug. 21, 1945 |
| 2,417,809 | Coleman et al. | Mar. 25, 1947 |
| 2,427,658 | Coleman et al. | Sept. 23, 1947 |
| 2,526,892 | Minich | Oct. 24, 1950 |